United States Patent [19]

Orr et al.

[11] Patent Number: 4,680,868
[45] Date of Patent: Jul. 21, 1987

[54] COORDINATE MEASURING MACHINE WITH COVERS

[75] Inventors: Ladd J. Orr; John J. Tuss, both of Englewood, Ohio

[73] Assignee: The Warner & Swasey Company, Cleveland, Ohio

[21] Appl. No.: 882,573

[22] Filed: Jul. 7, 1986

[51] Int. Cl.⁴ .............................................. G01B 5/03
[52] U.S. Cl. ..................................... 33/503; 33/1 M
[58] Field of Search ................ 33/1 M, 503, 504, 505, 33/556, 572, 573, 549, 551, 553, 554, 555, 558

[56] References Cited

U.S. PATENT DOCUMENTS

| | | | |
|---|---|---|---|
| 1,937,985 | 12/1933 | Schnuck | 384/15 |
| 2,417,672 | 3/1947 | Armitage | 384/15 |
| 3,148,003 | 9/1964 | Deflandre | 384/15 |
| 3,749,501 | 7/1973 | Wieg | 33/1 M X |
| 4,552,483 | 11/1985 | Anderka et al. | 384/15 X |
| 4,594,791 | 6/1986 | Brandstetter | 33/503 |

*Primary Examiner*—Harry N. Haroian
*Attorney, Agent, or Firm*—John R. Benefiel; Raymond J. Eifler

[57] ABSTRACT

A coordinate measuring machine (10) is disclosed of the type having a bridge (28) mounted for horizontal movement of a base (30), a carriage (24) mounted for horizontal movement in a direction orthogonal to the direction of bridge movement and a probe (12) mounted for vertical movement on the carriage (24), so that the probe (12) is guided along three orthogonal axes over a table (14) supported on a base (30), so as to enable measurement of an object (16) disposed on the table (14) by measuring the extent of travel along each axis. Side covers (42, 50) are provided fastened to the base (30) and enclose the lower ends of upright members (40) comprising in part the bridge (28) so that the bridge (28) movement is confined within openings (44) formed by the side covers (42, 50). A dust covering movable belt (46) is attached at either end to each upright member (40), closing off the openings (44), the belt (44) recirculating as the bridge moves. A cover (34) is provided for the upper cross member (26) having an opening (36) allowing movement of the carriage (24) with a curtain (38) disposed in the opening (36) to provide dust protection (FIG. 1).

9 Claims, 13 Drawing Figures

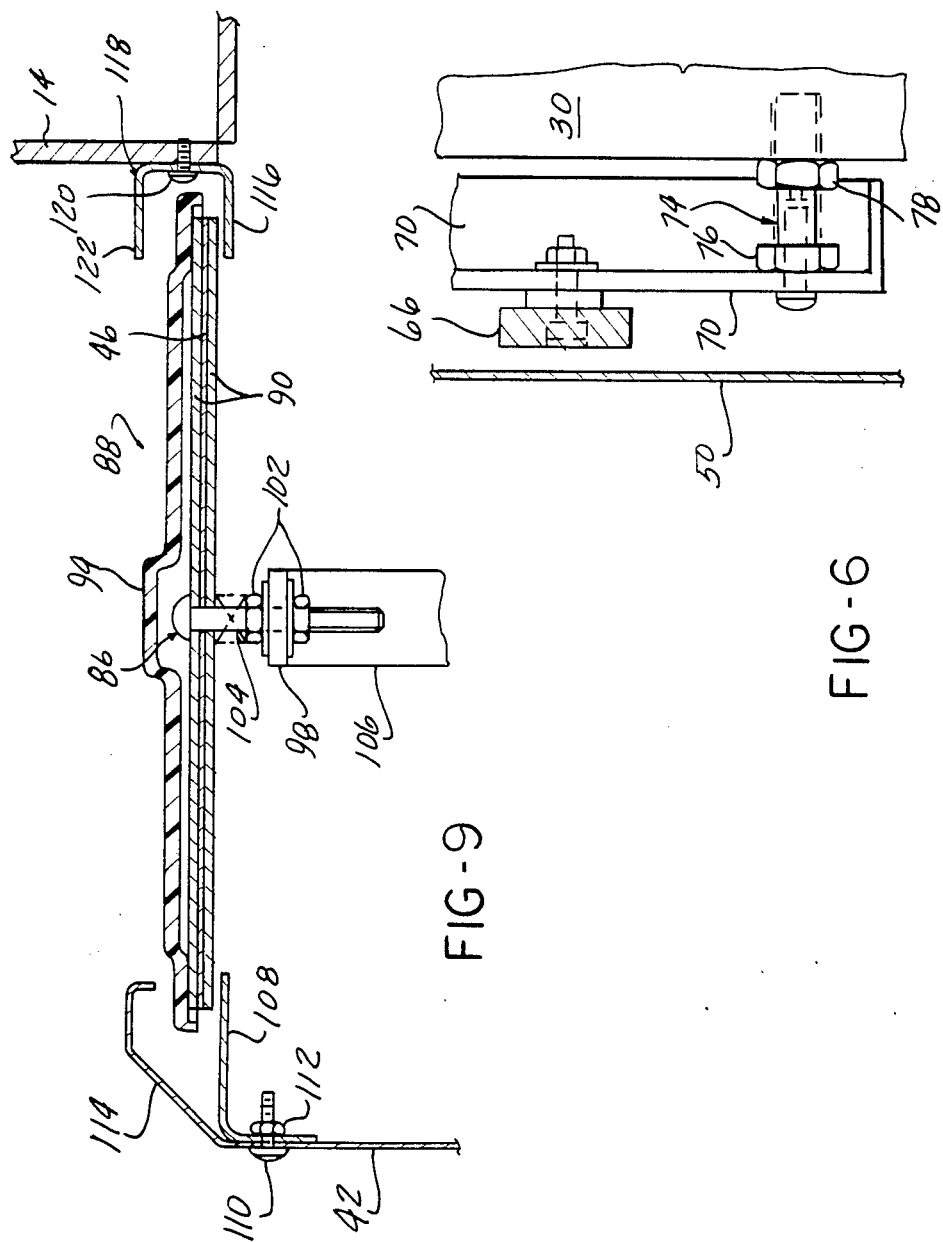

COORDINATE MEASURING MACHINE WITH COVERS

This invention relates to the field of dimensional measurement, and more particularly concerns coordinate measuring machines.

BACKGROUND

Coordinate measuring machines are known of the type having a bridge mounted on a base for guided movement along a first horizontal axis, a carriage mounted on the bridge for guided movement along a second horizontal axis orthogonal to the first axis, and a probe mounted for vertical movement on the carriage. The probe tip is thus movable along three orthogonal axes above the surface of a table mounted to the base and adapted to support an object to be measured.

The carriage is mounted for horizontal movement on an upper crossmember of the bridge. In this design, the bridge includes a pair of upstanding members disposed on either side of the table supporting the upper cross member, and also has a lower cross member extending beneath the table joining the lower ends of the upstanding members. The bridge is thus formed in a ring shape, which is of improved rigidity over open leg constructions.

The bridge moves on the base along precisely aligned ways formed on the base. Movement of the probe over points on the object to be measured allows dimensional measurements to be made on objects on the table by transducers which measure the extent of movement along each axis, and which generate corresponding electrical signals, which are processed and displayed.

The ring bridge type of coordinate measuring machine is disclosed in U.S. Pat. No. 4,594,791, issued on June 17, 1986, for "A Bridge Type Coordinate Measuring Machine", and also in USSR Pat. No. 621,955 issued in 1978.

In the aforementioned U.S. patents, the bridge is mounted on the ways by air bearings, which require very smooth way surfaces for completely true repeatable travel of the bridge on the ways.

Such machines also incorporate optical transducers as of the type shown in U.S. Pat. No. 2,886,717 issued on May 12, 1959 for "Measuring Apparatus" and U.S. Pat. No. 2,886,718, issue on May 12, 1959 for "Measuring Apparatus" and are operated in industrial settings, such that it is desirable that covering of the interior spaces and ways be provided to keep out dust and dirt and other contaminants.

Since the bridge moves relative the stationary table and base, any covering must accommodate this movement while not resulting in large openings that would allow entry of contaminants.

In such machines, deflection of the parts is advantageously kept to a minimum, since any deflections may produce slight non-repeatable discrepancies between actual probe movement and movement of the bridge and carriage as read by the transducers.

Bellows or accordion type shields have been employed in such coordinate measuring machines to cover the transducer components, which are compressed by the movement of the bridge. Such compression causes forces to be developed which tend to cause undesirable deflections of the machine structure. See U.S. Pat. No. 3,749,501 issued on July 31, 1973 for a "Measuring Machine for an example of such shielding.

Movement of the bridge may be powered as under computer or joystick control for more rapid measuring, and in such instances are powered movement of a bridge having portions extending below the table and alongside the base creates the possibility of inadvertent contact with a person who moves into the path of the bridge movement alongside the table. It is an object of this invention to lessen the chances of such contact by the design of the machine.

SUMMARY OF THE INVENTION

The present invention comprises coordinate measuring machines which include fixed exterior covers mounted to the front, sides and rear of the machine base, and movable cover means closing off the interior spaces of the machine from the entrance of dust and dirt. At the same time, the movable covers accommodate bridge movement while not generating significant deflecting forces on the machine structure.

In a first embodiment, the movable covers take the form of flat belts, each disposed over an opening lying between the peripheral covers and the machine table through which the lower ends of the bridge upstanding members move during traversing of the bridge as measurements are made. The belts recirculate on rollers to accommodate the bridge movement without imposing significant forces on the machine structure, and provide a self cleaning action. The exposed contour of the belt provides a smooth exterior appearance.

The fixed side covers in this embodiment also act to block movement of the operator into the path of movement of the bridge, and the bridge upstanding members are sloped to reduce the force of any operator contact with the bridge members.

In a second embodiment, contemplated for use in manually operated machines, the fixed side base covers are not employed, and vertically disposed pleated curtains attached to the bridge upstanding members are mounted on rods to close off the openings beneath the table through which the bridge lower cross member moves. The pleated curtains collapse and expand to accommodate bridge movement, but move freely on the support rods to eliminate compressive reaction forces and thereby avoid deflection of the machine parts.

In each embodiment, a bridge cover is mounted to the upper cross member, formed with an elongated opening through which the probe and carriage move, with a fixed on edge curtain shielding closing off the opening, which moves around the carriage and probe by being passed over a frame mounting rollers, to thereby accommodate the carriage motion while maintained in position over the opening through which the carriage traverses. A cover is also fixed to the carriage, enclosing the carriage and probe, configured to accommodate the entire upward travel of the probe.

DESCRIPTION OF THE INVENTION

FIG. 6 is a view of the section 6—6 taken in FIG. 5.

FIG. 9 is an enlarged fragmentary view of the section 9—9 taken in FIG. 8.

Figure 1:
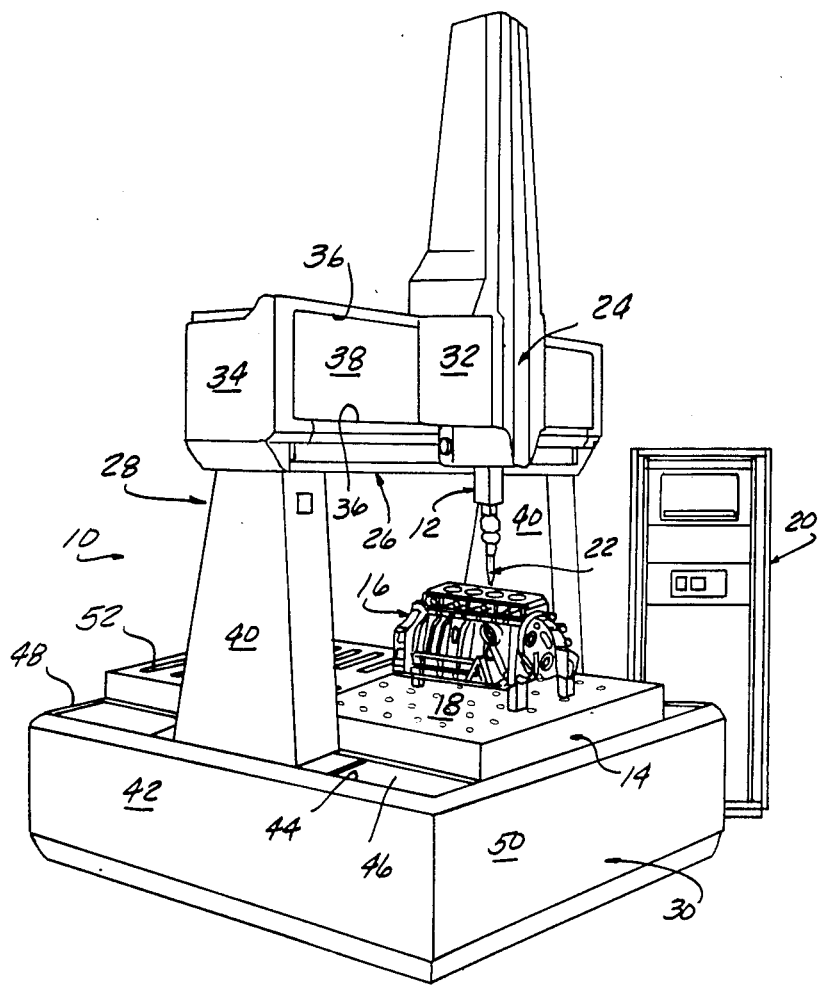
FIG. 1 is a perspective view of a coordinate measuring machine incorporating covers according to a first embodiment of the present invention.

FIG. 1 shows a coordinate measuring machine 10 incorporating the covers according to the present invention, in which a probe 12 is mounted for movement along three orthogonal axes above a table 14 in order to carry out measurements on an object 16 to be measured, disposed on the planar upper horizontal surface 18 of the table 14.

Transducer means (not shown) generate electrical signals corresponding to movement along each axis, which are processed in an electronics processor and display 20 to provide a display of corresponding measurements of distances between points on the object 16, between which the probe tip 22 has been moved.

The details of suitable transducers and signal processing display devices are not described here, since these do not form a part of the present invention, and suitable such devices are known to those skilled in the art.

The probe 12 is mounted for vertical movement on a carriage 24, which is in turn mounted on the upper cross member 26 of a bridge 28 for movement in a first horizontal direction. The bridge 28 is itself mounted on a base 30 for horizontal movement in a direction orthogonal to the direction of horizontal movement of the carriage 24 to thereby enable the movement of the probe 12 in three orthogonal axes in the manner now well known to those skilled in the art.

According to the present invention, the coordinate measuring machine 10 is completely enclosed with a cover system, including a probe-carriage cover 32 accommodating the entire vertical travel of the probe 12, the cover 32 comprised of formed or molded plastic or sheet metal.

The upper cross member 26 of the bridge 28 is enclosed with a bridge cover 34, having a horizontally extending opening 36, allowing the carriage 24 to extend therein and engage guide ways.

The opening 36 is covered with a shielding curtain 38 with a mounting herein described which accomodates the travel of the carriage 24 as will be described hereinafter.

The bridge 28 includes vertically upstanding side members 40 located on either side of the table 14, which extend within base side covers 42 spaced outwardly from the table 14 to provide openings 44, through which each of the bridge side members 40 move. The openings 44 are each closed off with movable cover means comprised of a pair of movable belts 46 which are connected to move with the bridge 28 and accommodate its movement by a mounting arrangement to be described.

The rear and front covers 48 and 50 complete the enclosure of the base 30 about the entire periphery thereof, while a table cover 52 is disposed over the horizontal space to the rear of the table 14. The table 14 extends for only a portion of the front to rear length of the machine 10 while the bridge 28 is movable through substantially the entire length to enable complete access of the probe tip 22 to the table surface 18, as described in detail in copending application Ser. No. 882,572, filed July 7, 1986.

Each of the covers 42, 48, 50 and 52 may be made of plastic or sheet metal constructed by conventional fabricating techniques.

Figure 2:
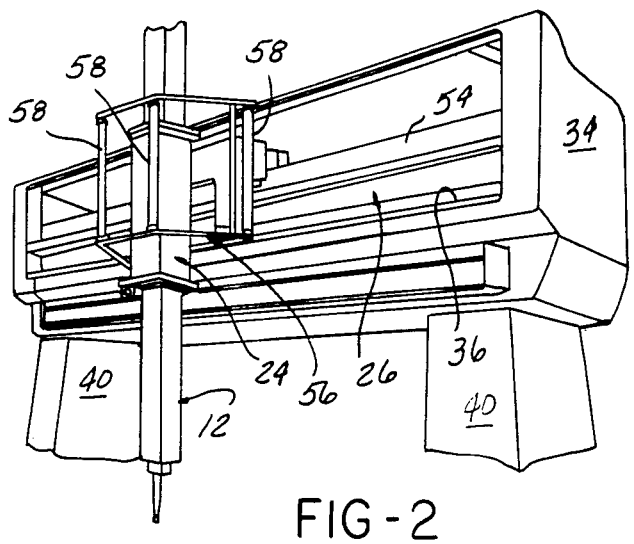
FIG. 2 is a perspective view of the upper portions of the coordinate measuring machine shown in FIG. 1, with the covers and curtain according to the present invention removed.

FIG. 2 shows the upper region of the coordinate measuring machine 10 with the cover 32 and curtain 38 removed to expose way surfaces 54 on the cross member 26. A roller frame 56 is attached to carriage 24, carrying a series of rollers 58 arrayed about the periphery of the carriage 24.

Figure 3:
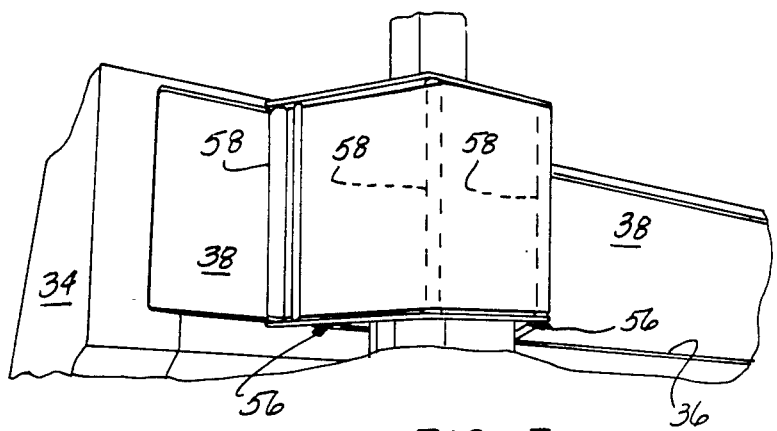
FIG. 3 is a perspective view of the upper portions of the coordinate measuring machine shown in FIG. 1 with the probe and carriage cover removed but with the curtain installed.

FIG. 3 shows that the curtain 38 passes under and over the rollers 58 to enable the carriage 24 to be traversed on the way surfaces 54 (FIG. 2), while the curtain 38 is fixed at either end within the cover 34.

Figure 4:
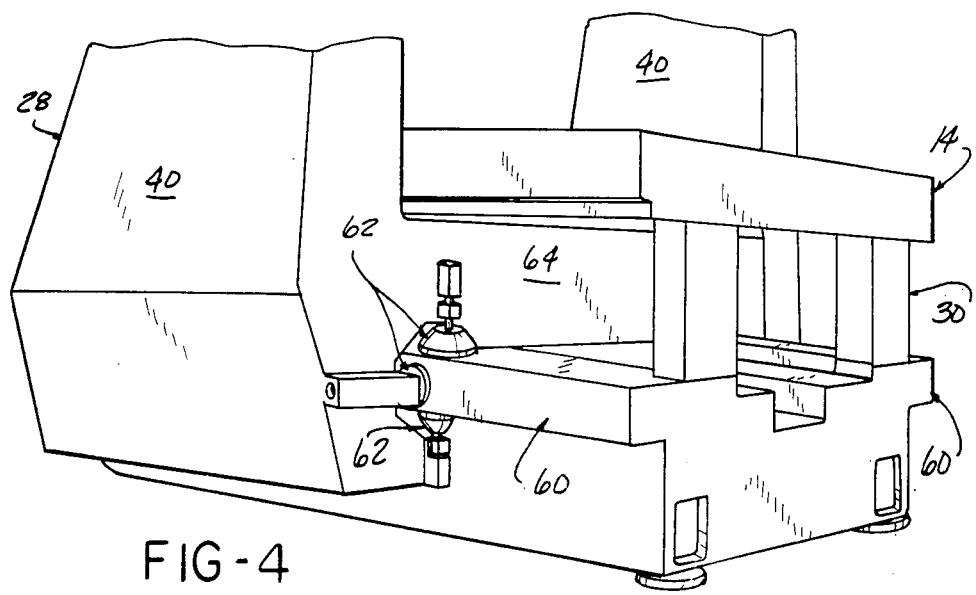
FIG. 4 is a side perspective view of the lower portion of the coordinate measuring machine shown in FIG. 1 with the fixed and movable covers removed.

FIG. 4 shows the lower portions of coordinate measuring machine 10 with the side and front covers 42, 50 of the base 30 removed.

It can be seen that the base 30 includes parallel ways 60 on which air bearing assemblies 62 support the bridge 28 for guided movement thereon. The table 14 is supported above the base 30 to create a space therebetween which receives a lower cross member 64 of the bridge 28 connecting the lower end of each upstanding member 40 of the bridge 28.

The bridge 28 thus must sweep through the regions extending along either side of the table 14, creating the possibility of contact with an operator or bystander.

The covers 42, 48 and 50 create a barrier preventing entry of an operator into those regions to reduce this hazard. The sides of the bridge upstanding members 40 are angled to reduce the force of any impact therewith.

FIGS. 5-9 show details of the mounting of the covers 42, 48 and 50, and movable belts 46.

The front cover 50 is attached to the ends of a pair of vertically spaced horizontally extending mounting bars 66, which in turn are mounted on inclined angle pieces 70 affixed to the base 30 by means of stud bolts 74 (FIG. 6). Stud bolts 74 include a head socket 76 and locking nut 78 to allow adjustment of cover 50 so as to be able to be fit closely to the table 14 at assembly. Since the base 30 is cast and its dimensions may vary so as to otherwise preclude a close fit such adjustment means is desirable. Cap screws 80 are employed to attach the bars 66 to the angle pieces 70.

Corner covers 82 are fit over the formed ends 84 of the bars 66, and have offset edges such that the front cover 50 and side cover 46 are received thereover with a flush fit as shown, and screws 72 secure the corner covers 82 to the bar ends 84. Screws 86 pass through the corners 82 and covers 50 and 46, and are received into ends 84 of bars 66 to secure the same.

A similar mounting of the rear cover 48 is employed, so that a detailed description is not here repeated.

Each dust covering movable belt 46 may be of a suitable durable flexible sheet material such as vinyl, and is attached at either end on the front and rear sides of an upstanding bridge member 40 by means of spring loaded bracket assemblies 88. Bracket assemblies 88 include clamping bars 90 secured together with screws 92 with the belt 46 sandwiched therebetween. A trim cover 94 overlies each bracket assembly 88 to provide a smooth finished appearance.

Each bracket assembly includes a machine screw 96 passing through the clamping bars 90 and an adjustment slot 97 in the angled upper end of a support bar 100 secured by locking nuts 102, with a spring 104 interposed beneath the lower clamping bars 90. Support bar 100 is fastened to the bridge 28 with screws 106. Spring 104 creates a tensioning effect on the belt 46 to maintain tightness even with changes in temperature, humidity, etc.

The outside edge of end belt 46 is supported by an edge support 108 fastended to side cover 42 by screws 110 and nuts 112, with an edge lip 114 of the side cover 42 overlying the outer edge of the belt 46. The inside edge of the belt is supported on the lower leg 116 of a channel 118 fastened with screws 120 to the table 14, the upper leg 122 overlying the inner edge of belt 46.

The length of the belt 46 passes over a roller system so as to be recirculated as the bridge 28 moves fore and aft during the taking of measurements.

The roller system is supported on roller bracket assemblies 124 located at the front and rear of the machine 10, disposed within the front, side and rear covers 42, 48 and 50.

Figure 7:
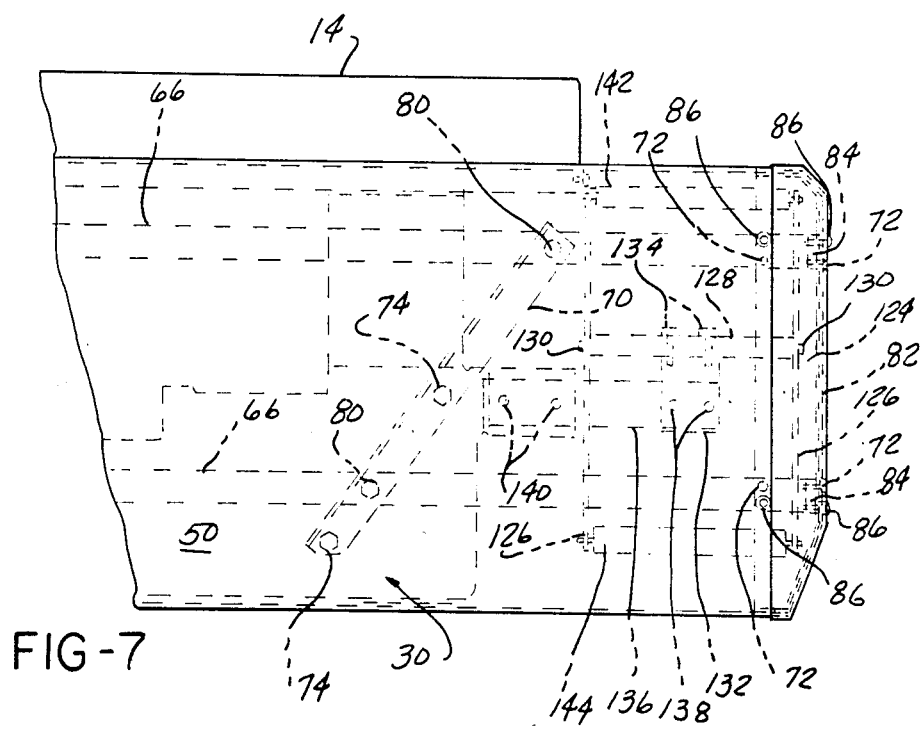
FIG. 7 is a fragmentary front view of the table and base portions of a coordinate measuring machine incorporating a cover arrangement according to a first embodiment of the present invention.
Figure 5:
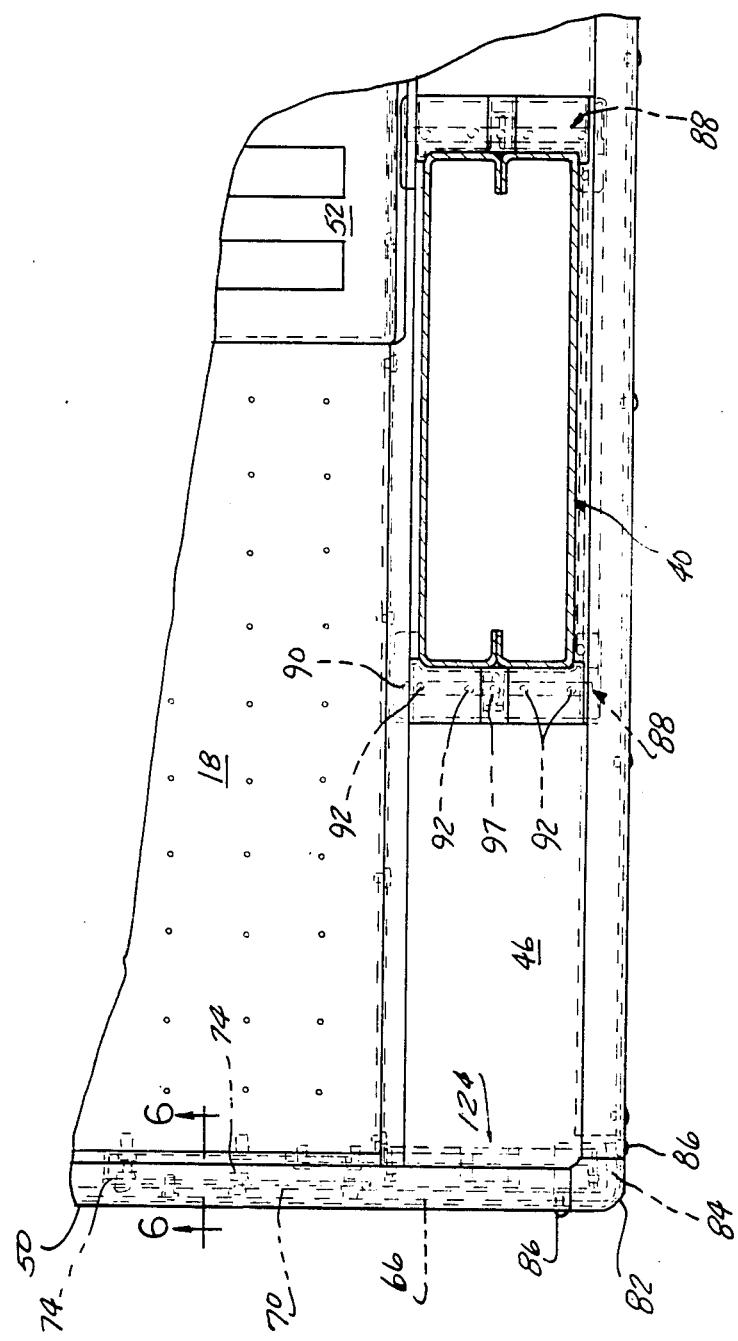
FIG. 5 is a fragmentary view of a horizontal section taken through the bridge of the machine shown in FIG. 1.
Figure 8:
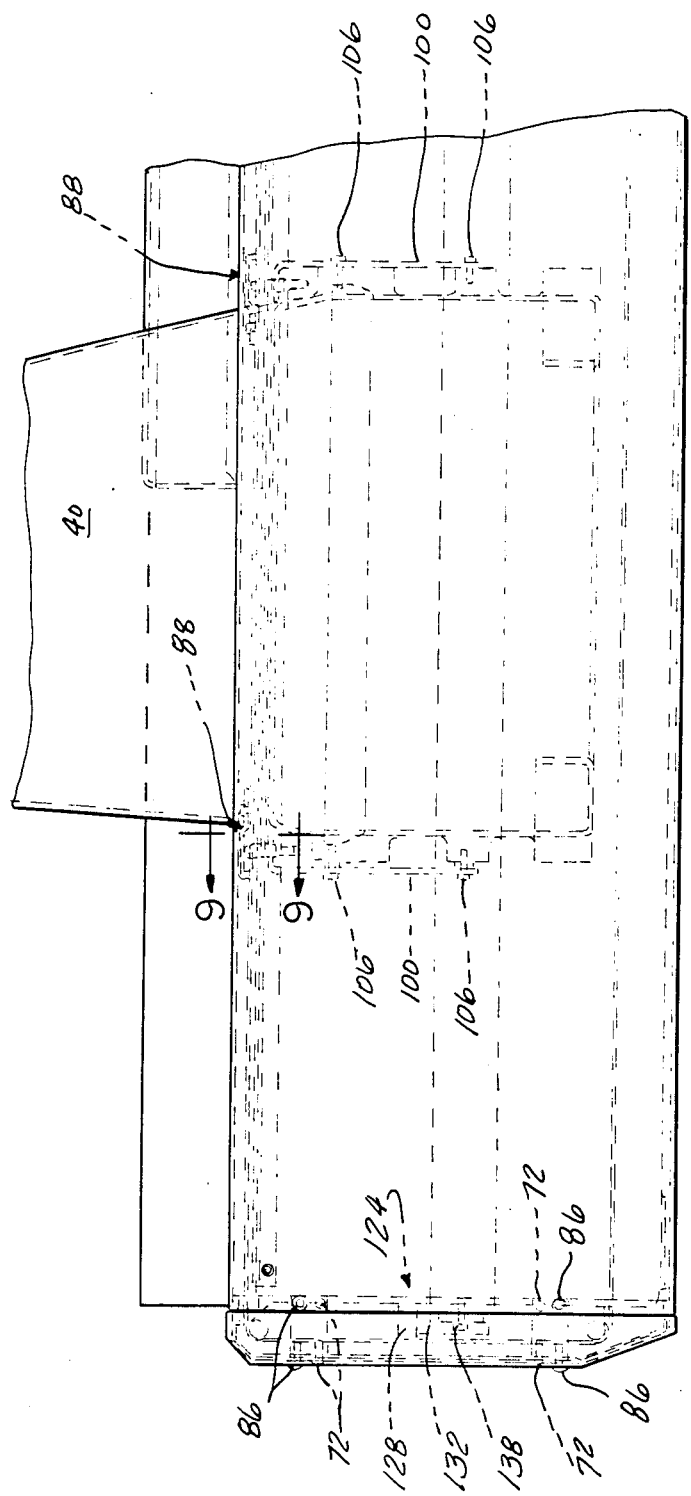
FIG. 8 is a fragmentatary side elevational view of the table and base portions of the coordinate measuring machine shown in FIG. 1.
Figure 10:
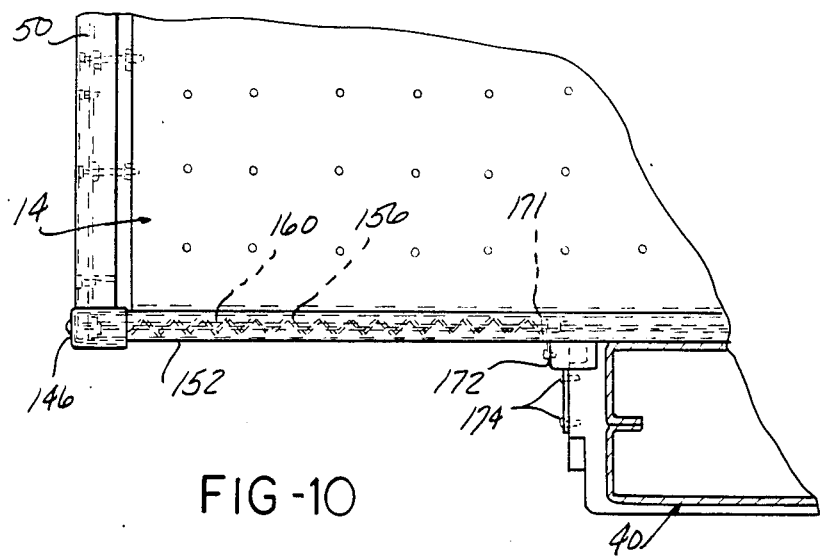
FIG. 10 is a fragmentary plan view of a front corner of a second embodiment of a coordinate measuring machine according to the present invention.
Figure 12:
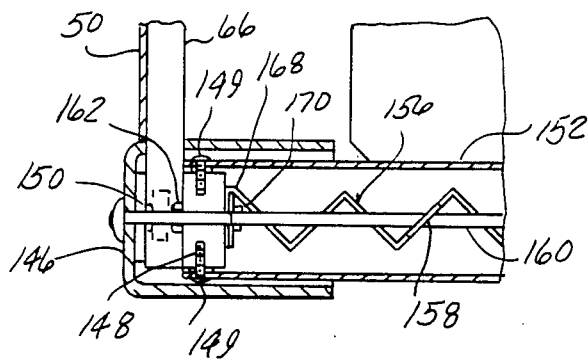
FIG. 12 is a view of the section 12—12 taken in FIG. 11.
Figure 13:
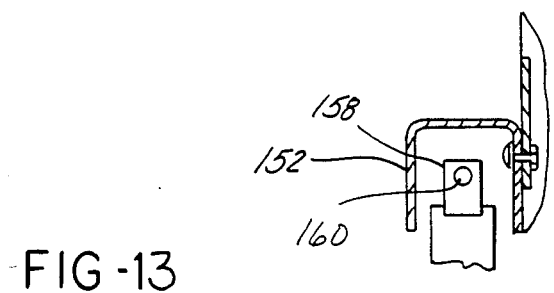
FIG. 13 is a view of the section 13—13 taken in FIG. 11.
Figure 11:
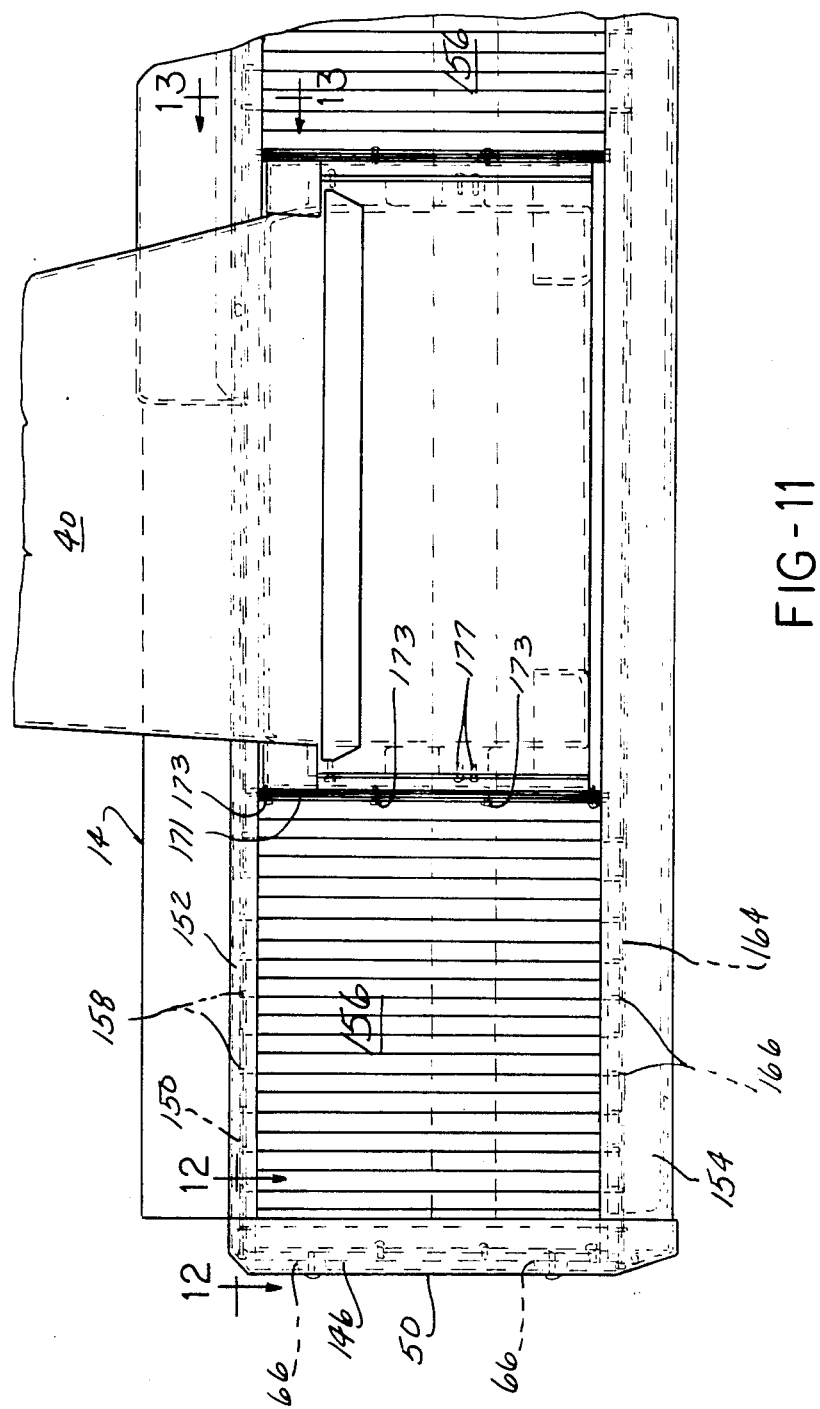
FIG. 11 is a fragmentary side elevational view of the coordinate measuring machine shown in FIG. 10.

FIG. 7 best illustrates that each roller assembly 124 includes a pair of vertical side plates 126, with at least one cross bar 128 securing side plates 126 to a respective end with cap screws 130. Cross bar 128 in turn is mounted to a mounting piece 132 with screws 134 passing through slots in cross bar 128 to provide adjustability.

Mounting piece 132 in turn is fixed to an extension 136 by screws 138 passing through slots in one end of the extension 136, the other end thereof fixed to the base 30 by screws 140 also passing through slots in extension 136 to provide additional adjustability to insure proper tracking of the belt 46.

Upper and lower rollers 142 and 144 are rotatably mounted between plates 126, and the belt 46 passes around upper roller 142, descends vertically to lower roller 142, and thence passes rearwardly to the other roller assembly 124 for return to the rear of the bridge member 40.

Thus a self cleaning action is produced by the circulation of the belt 46, dumping any accumulated dust and dirt as the belt descends during movement of the bridge 28.

The resistance of the belt to movement of the bridge 28 is negligible, so that deflection of the structural components of the machine 10 is held to negligible levels, while affording effective shielding with a trim exterior appearance.

FIGS. 10-13 illustrate an alternate covering arrangement for machines which are manually operated to provide better access to the table surface 18 for making measurements by manual manipulation of the probe 12.

In this embodiment, the side covers are not employed so that the table 14 may be approached more closely by the operator stepping into the space ahead of the bridge upstanding members 40. The front cover 50 may be mounted in similar fashion beneath corner covers 146 which are fastened with screws 150 to vertical support bars 66.

A U-shaped top curtain rail 152 is received beneath the corner as well as a bottom panel 154, extending from corner to corner, curtain rail 152 fastened at each end to a vertical support bar 148 with screws 144.

There is disposed within each opening between the bridge 28 and a corner cover 146, a panel comprised of a pleated curtain 156 vertically suspended from a tabs 158 having openings receiving an upper rod 160 mounted at either end in a vertical support bar 148 with nut 162. A lower rod 164 mounted in similar fashion received in openings in lower tabs 166.

The pleated curtain 156, constructed of suitable durable sheet material, is clamped along its forward edge beneath a keeper strip 168 secured with screws 170; and along its rear edge with a keeper strip 171 secured with screws 173 to a Z-bracket 172 mounted to bridge upstanding member 40 with screws 174.

The curtains 156 each collapse and expand freely with movement of the bridge 28, so as to not exert significant forces on the machine structure such that non repeatable errors are avoided.

Thus, a trim exterior is also provided, while protecting the internal components from air borne contaminants. The vertical disposition also provides a self cleaning feature, as accumulating dirt is dislodged and falls off the curtains 156 with movement of the bridge 28.

We claim:

1. A coordinate measuring machine (10) of the type including a base (30) having generally vertically extending sides defining a base perimeter, a table (14) fixed to the top of the base (30) said table (18) having a horizontal planar surface (18), a bridge (28) mounted for guided horizontal movement on said base (30) along a first axis, said bridge (28) including a pair of vertical upstanding members (40) each having a lower portion extending alongside a respective opposite side of said base (30), said upstanding members extend above and below the level of said planar surface (18) of said table (14), an upper cross member (26) connecting the upper ends of said upstanding members (40), a carriage (24) supported for movement on said upper cross member (26) along a second horizontal axis orthogonal to said first axis, and a probe (12) mounted for guided vertical movement on said carriage (24), the improvement comprising:

vertically extending cover means;
at least in part extending around the side of said base (30) and said table (14); including a pair of panels comprising side covers (42) mounted to a respective side of said base (30) spaced away from the side of said table (14) and base (30) beyond the outer lower portions of said upstanding member to establish an elongated horizontal opening (44) on said opposite sides of said table (14) and base (30), lying between said table (14) and each side cover (42) through which said upstanding members (40) move as said bridge (28) moves along said first horizontal axis.

2. The coordinate measuring machine according to claim 1 further including movable cover means (46) disposed to cover said elongated openings (44), said movable cover means fixed to said bridge (28) to be moved by movement of said bridge (28) along said opening (44).

3. The coordinate measuring machine according to claim 1 wherein said movable cover means (46) comprises a pair of continuous flat, flexible belts (46), each disposed in a respective elongated opening (44) and attached at either end to the forward and rear side of a respective upstanding member (40), and a roller assembly (124) located at the front and rear of each opening (44) over which each belt (46) passes to direct each belt (46) forwardly from said bridge (28) downwardly at the forward end of said opening 944) downwardly and rearwardly beneath the lower portion of said bridge (28) upstanding members (40), whereby each of said belts (46) is circulated around said roller assemblies (124) as said bridge (28) moves through said openings.

4. The coordinate measuring machine according to claim 3 further including rigid edge supports (108,116) disposed beneath edge of each of said belts (46) and over which each belt (46) moves.

5. The coordinate measuring machine according to claim 4 further including an edge cover (114,122) disposed over each edge of each belt (46).

6. The coordinate measuring machine according to claim 3 further including a spring tensioned bracket (100) attaching each end of each belt (46) to said bridge (28) so as tend to move said end down to to apply a tension to each of said belts (46) to maintain tightness thereof.

7. A coordinate measuring machine (10) of the type including a probe (12) supported to be movable along three orthogonal axes over a table (14), the probe vertically movable on a carriage (24) and the carriage (24) horizontally movable on an upper cross member (26) of a bridge (28), the improvement comprising:

a cover (34) surrounding said upper cross member (26) with a vertical opening extending horizontally along the length of said upper cross member (26) accommodating said movement of said carriage (24), and a curtain (38) disposed to close off said opening (36), and roller means (56) attached to said carriage (24) along said curtain (38) and guiding said curtain around the outside of said carriage (24); a probe-carriage cover (32) fixed to said carriage (24) completely enclosing the vertical path of travel of said probe (12).

8. A coordinate measuring machine (10) of the type including a probe (12) mounted for movement along three orthogonal axes above a table (14) supported on a base (30), said probe (12) vertically movable on a carriage (24) supported on an upper cross member (26) of a bridge (28) to be movable in a horizontal direction, said bridge (28) guided on a base (30) for movement in a horizontal direction orthogonal to said carriage movement, said bridge (28) including a lower cross member (64) extending beneath said table (14) and above said base (30) and connecting the lower ends of said located on either side of said table (14), bridge upstanding members (40), connected by upper cross member (26), the improvement comprising:

a front cover (50) and a rear cover (48) affixed to the front and rear of said base (30) respectively; a plurality of curtains (156) each extending from a respective front and rear of each of said bridge upstanding members (40), each curtain (156) connected along its opposite edge to said bridge upstanding members (40) and to said front and rear covers respectively (50, 48); each of said curtains (156) comprising pleated flexible material panels, and further including a plurality of upper and lower rods (150, 164) affixed to said front and rear covers (50, 48) passing through openings in said panels thereby vertically suspending the upper and lower edges of a respective curtain (156) and allowing free compression of the pleats.

9. The coordinate measuring machine according to claim 8 further including elongated upper and lower trim pieces (152, 154) fixed to either side of said base (30) and within which each curtain (156) is disposed.

* * * * *